(12) United States Patent
Ishizawa et al.

(10) Patent No.: US 11,822,027 B2
(45) Date of Patent: Nov. 21, 2023

(54) NEUTRON POSITION DETECTOR

(71) Applicant: CANON ELECTRON TUBES & DEVICES CO., LTD., Otawara (JP)

(72) Inventors: Kazuya Ishizawa, Otawara (JP); Noriyuki Hikida, Otawara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 0 days.

(21) Appl. No.: 17/937,470

(22) Filed: Oct. 3, 2022

(65) Prior Publication Data

US 2023/0110535 A1 Apr. 13, 2023

Related U.S. Application Data

(63) Continuation of application No. PCT/JP2020/027636, filed on Jul. 16, 2020.

(30) Foreign Application Priority Data

Apr. 15, 2020 (JP) .................. 2020-072928

(51) Int. Cl.
*G01T 3/00* (2006.01)
*H01J 47/12* (2006.01)

(52) U.S. Cl.
CPC .............. *G01T 3/006* (2013.01); *G01T 3/008* (2013.01); *H01J 47/12* (2013.01); *H01J 47/125* (2013.01)

(58) Field of Classification Search
CPC .......... G01T 3/006; G01T 3/008; H01J 47/12; H01J 47/125
See application file for complete search history.

(56) References Cited

U.S. PATENT DOCUMENTS

| 10,126,441 | B1* | 11/2018 | Hikida | ............. G01T 3/008 |
| 2006/0017000 | A1* | 1/2006 | Martoff | ............. G01T 1/2935 |
| | | | | 250/390.02 |
| 2011/0114848 | A1* | 5/2011 | Frank | ............. G01T 1/18 |
| | | | | 250/374 |
| 2013/0119261 | A1 | 5/2013 | Mckinny et al. | |
| 2014/0166891 | A1 | 6/2014 | Larrick et al. | |
| 2014/0183372 | A1 | 7/2014 | Frank et al. | |
| 2018/0329088 | A1 | 11/2018 | Hikida et al. | |

FOREIGN PATENT DOCUMENTS

| JP | 2-39187 U | 3/1990 |
| JP | 2013-104873 A | 5/2013 |
| JP | 2016-505835 A | 2/2016 |
| JP | 2017-142135 A | 8/2017 |
| JP | 6228340 B1 | 11/2017 |
| JP | 2019-190848 A | 10/2019 |
| WO | WO 2014/126622 A1 | 8/2014 |

OTHER PUBLICATIONS

International Search Report dated Sep. 29, 2020 in PCT/JP2020/027636, filed on Jul. 16, 2020, 3 pages.

\* cited by examiner

*Primary Examiner* — Mark R Gaworecki
(74) *Attorney, Agent, or Firm* — Oblon, McClelland, Maier & Neustadt, L.L.P.

(57) ABSTRACT

A neutron position detector according to an embodiment includes a tubular enclosure used as a cathode, an anode located at an axial center inside the enclosure, and a gas that includes a $^3$He gas and an additive gas and is sealed inside the enclosure. The additive gas includes nitrogen as a quenching gas, and argon as a gas that reduces the ranges of reaction products as neutron and $^3$He gas.

20 Claims, 3 Drawing Sheets

| GAS TYPE | PROTON p RANGE [mm] | TRITIUM T RANGE [mm] |
|---|---|---|
| $^3$He | 51.1 | 19.5 |
| CARBON DIOXIDE | 6.4 | 2.1 |
| CARBON TETRAFLUORIDE | 3.8 | 1.5 |
| METHANE | 9.8 | 2.3 |
| NITROGEN | 9.7 | 2.8 |
| ARGON | 10.7 | 2.8 |

| GAS TYPE | OPERATING VOLTAGE [V/atm] |
|---|---|
| $^3$He | 23.6 |
| CARBON DIOXIDE | 970 |
| CARBON TETRAFLUORIDE | 865 |
| NITROGEN | 1060 |
| ARGON | 292 |

NEUTRON POSITION DETECTOR

CROSS-REFERENCE TO RELATED APPLICATIONS

This application is a continuation application of International Application No. PCT/JP2020/027636, filed on Jul. 16, 2020; and is also based upon and claims the benefit of priority from the Japanese Patent Application No. 2020-072928, filed on Apr. 15, 2020; the entire contents of which are incorporated herein by reference.

FIELD

Embodiments of the invention relate to a neutron position detector used in the position distribution measurement of neutrons.

BACKGROUND

For example, neutron position detectors are used in applications in an accelerator facility in which neutrons are irradiated on a sample to be examined and the characteristics of the sample are examined by detecting the scattering of the neutrons, etc.

A neutron position detector includes a position-sensitive neutron detection proportional counter (PSD) as a neutron position detector, a processing circuit that calculates the neutron incident position by processing a charge output from the neutron position detector, etc.

A neutron position detector includes a tubular enclosure used as a cathode; an anode is located at the axial center inside the enclosure; and a gas that includes a $^3$He gas and an additive gas are sealed inside the enclosure. Then, when a neutron enters the enclosure, the $^3$He inside the gas has a nuclear reaction with the neutron that produces a proton and tritium; the proton and the tritium travel through the gas and ionize the surrounding gas; and the ionized charge is collected by the anode. Then, the incident position of the neutron is detected in a processing circuit based on the output charge from the two ends of the anode.

In such a neutron position detector, the additive gas degrades and the life is easily reduced when the neutron intensity is high.

It is therefore desirable for a neutron position detector to have a longer life while ensuring the position resolution, i.e., the detection accuracy of the incident position of the neutron.

DETAILED DESCRIPTION

A neutron position detector of the embodiment includes a tubular enclosure used as a cathode, an anode located at an axial center inside the enclosure, and a gas that includes a $^3$He gas and an additive gas and is sealed inside the enclosure. The additive gas includes nitrogen as a quenching gas, and argon as a gas that reduces the ranges of reaction products of a neutron and the $^3$He gas.

An embodiment will now be described with reference to the drawings.

Figure 1:
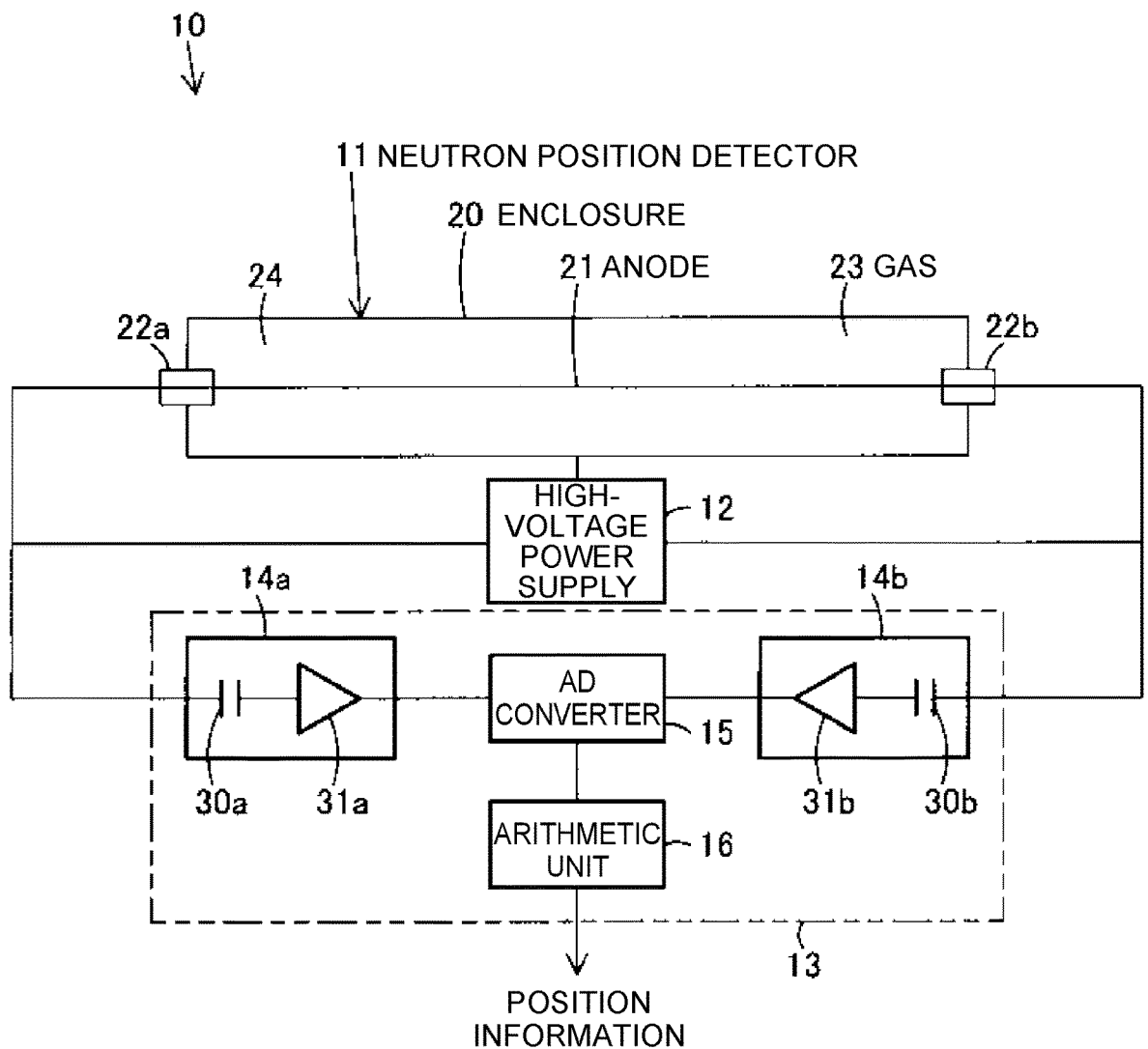
FIG. 1 shows an embodiment, and is a configuration diagram of a neutron position detection device using a neutron position detector.

As shown in FIG. 1, a neutron position detection device 10 includes a neutron position detector 11, a high-voltage power supply 12, and a processing circuit 13. The processing circuit 13 includes preamplifiers 14a and 14b, an AD converter 15, an arithmetic unit 16, etc.

Also, the neutron position detector 11 is a one-dimensional position-sensitive neutron detection proportional counter (PSD). The neutron position detector 11 includes a tubular enclosure 20 that is a cathode, an anode 21 located at the axial center of the enclosure 20, terminal parts 22a and 22b located at the two ends of the enclosure 20, and a gas 23 sealed inside the enclosure 20. The enclosure 20 has a circular tubular shape that is long in the axial direction and sealed at two ends. A sealed space 24 is provided inside the enclosure 20.

The anode 21 is a resistive core wire (a resistive metal wire) having a constant resistance value per unit length. The anode 21 is located along the axial center inside the enclosure 20; and the two ends of the anode 21 are linked to and electrically connected to the terminal parts 22a and 22b.

The terminal parts 22a and 22b are located at the two ends of the enclosure 20 in an insulated state with respect to the enclosure 20. The two ends of the anode 21 are linked to and electrically connected to the terminal parts 22a and 22b.

The gas 23 is sealed in the sealed space 24 of the enclosure 20. The gas 23 includes a $^3$He gas that is ionized by absorbing the neutrons, and an additive gas that is added to the $^3$He gas.

The partial pressure of the $^3$He gas is arbitrarily set according to the specification of the neutron detection efficiency and is, for example, in the range of 10 to 20 atm.

The additive gas includes nitrogen as a quenching gas that is a molecular gas, and an argon for reducing the ranges of protons and tritium that are reaction products of the neutrons and the $^3$He gas. In such a case, the relationship of d×pN2>0.03 is favorable, where d (cm) is the inner diameter of the enclosure 20, and pN2 (atm) is the partial pressure of nitrogen. Also, the relationship is favorable when the partial pressure of the argon added to the $^3$He is greater than the partial pressure of nitrogen. It is favorable for the partial pressure of the argon added to the $^3$He to be in the range of 1 to 3 atm.

Also, the composition of the gas 23 is such that the partial pressure of the $^3$He gas and the partial pressure of the additive gas are set so that the total of the ranges of the proton and tritium inside the gas 23 is, for example, in the range of 2.0 to 2.7 mm.

Also, the high-voltage power supply 12 applies an operating voltage between the anode 21 and the enclosure 20 that is the cathode. For example, the operating voltage is set to the range of 2.0 to 2.5 kV so that the output charge from the anode 21 is, for example, 2 to 5 pC.

Also, the preamplifiers 14a and 14b of the processing circuit 13 respectively convert the output charges from the two ends of the neutron position detector 11 (hereinbelow, called the two detector ends) into electrical signals and output the electrical signals. The preamplifiers 14a and 14b include coupling capacitors 30a and 30b that cut high-voltage components applied to the neutron position detector 11, op-amps 31a and 31b that convert the output charges after cutting high-voltage components into prescribed electrical signals, etc. To adapt to an increase of the operating voltage of the neutron position detector 11, a higher capacitance and lower distortion due to lower impedance may be realized by connecting two of each of the coupling capacitors 30a and 30b in parallel. Furthermore, it is favorable to use JFET input operational amplifiers as the op-amps 31a and 31b to suppress the operation delay distortion to a minimum.

Also, the AD converter 15 converts the electrical signals (the analog signals) of the two detector ends output from the preamplifiers 14a and 14b into digital signals (waveform signals). The AD converter 15 includes an element having a resolution of not less than 14 bits. For example, the AD converter 15 may include an element having a resolution of 16 bits.

Also, the arithmetic unit 16 determines the wave heights from the waveform data of the electrical signals of the two detector ends digitized by the AD converter 15 and calculates the incident position of the neutron in the axial direction of the neutron position detector 11 based on the ratio of the wave heights.

An operation of the neutron position detection device 10 will now be described.

The operating voltage is applied between the anode 21 and the enclosure 20 that is the cathode by the high-voltage power supply 12.

Figure 2A:
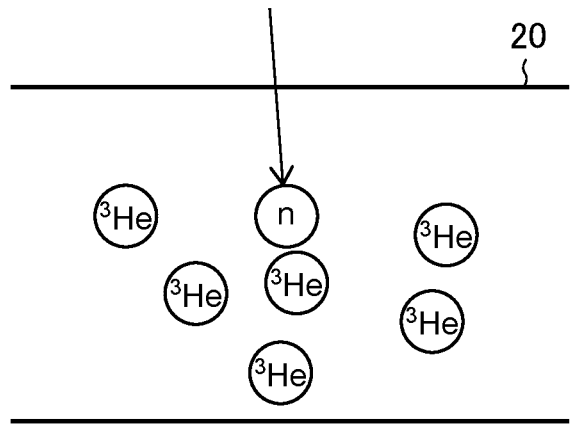
FIG. 2 is an explanatory drawing describing an operation of the same neutron position detector from neutron incidence to gas ionization in the order of (a), (b), and (c).
Figure 2B:
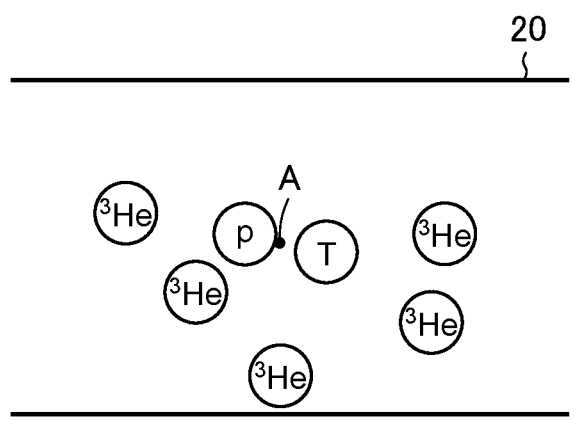

Then, as shown in FIGS. 2A and B, when a neutron n enters the enclosure 20, a nuclear reaction occurs between the neutron n and the $^3$He gas (n+$^3$He→p+T+765 keV), and a proton p and tritium T that are reaction products are produced. "A" shown in FIG. 2B is the position at which the nuclear reaction occurred and is the position at which the proton p and the tritium T were produced.

Figure 2C:
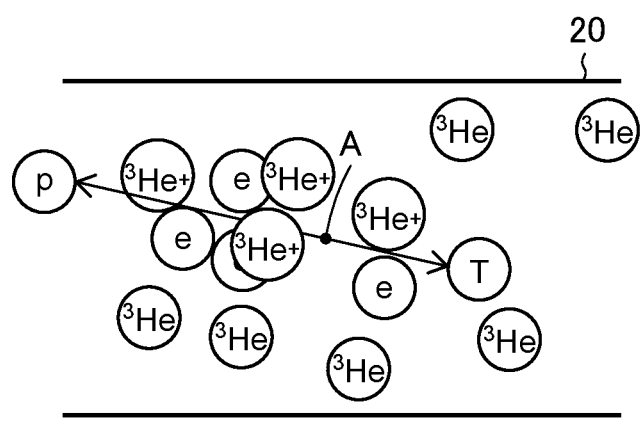

As shown in FIG. 2C, the proton p has about 574 keV of energy, and the tritium T has 191 keV of energy; and the proton p and the tritium T travel through the gas 23 in mutually-opposite directions to gradually stop due to the loss of energy due to colliding with the atoms and molecules of the surrounding gas 23. When the proton p and the tritium T collide with the gas 23, a portion of the energy of the proton p and the tritium T is transferred to the gas 23 to ionize the gas 23 and generate a charge e.

The generated charge e is collected by the anode 21 due to the electric field formed between the anode 21 and the enclosure that is the cathode. Thereby, the output charges that are output from the two ends of the anode 21 are of a ratio corresponding to the distances to the two ends of the anode 21 from the collection position of the charge e in the anode 21. The output charges that are from the two detector ends (the two ends of the anode 21) are converted into electrical signals by the preamplifiers 14a and 14b; and the electrical signals of the two detector ends output from the preamplifiers 14a and 14b are converted into digital signals (waveform signals) by the AD converter 15.

In the arithmetic unit 16, the wave heights are determined from the waveform data of the electrical signals of the two detector ends digitized by the AD converter 15; and the incident position of the neutron n in the axial direction of the neutron position detector 11 is calculated based on the ratio of the wave heights.

The additive gas that is used in the neutron position detector 11 will now be described.

The neutron position detector 11 is one type of proportional counter. For stable operation of the proportional counter, a molecular gas other than the $^3$He gas that causes the nuclear reaction with the neutron n is added. For example, as in Reference 1 (Radiation Detection and Measurement, third edition, p. 190, published by Nikkan Kogyo Shimbun), an object of adding the molecular gas is to absorb the ultraviolet rays produced when the ionized $^3$He ions recombine, thereby stabilizing the operation of the proportional counter.

A gas having such an effect is generally called a quenching gas. It is possible to use any gas that absorbs ultraviolet rays, and although methane ($CH_4$), carbon dioxide ($CO_2$), and carbon tetrafluoride ($CF_4$) are widely used as commercial products, nitrogen, hydrogen, etc., can also be used. For example, Reference 2 (the specification of U.S. Pat. No. 3,092,747) includes an example in which nitrogen is used as a quenching gas in a proportional counter.

On the other hand, to date, there are no products that use nitrogen as the quenching gas of the neutron position detector 11; and many products use carbon dioxide or carbon tetrafluoride.

Reasons that nitrogen is not used as the quenching gas of the neutron position detector 11 will now be described.
(Reason 1)

Although the neutron position detector 11 is a detector for performing the position detection of the neutron n, the accuracy of the position detection, i.e., the position resolution, which is an important item of the detector performance, is affected by the ranges of the proton p and the tritium T that are reaction products through the gas 23.

Figures 3, 4, 5:
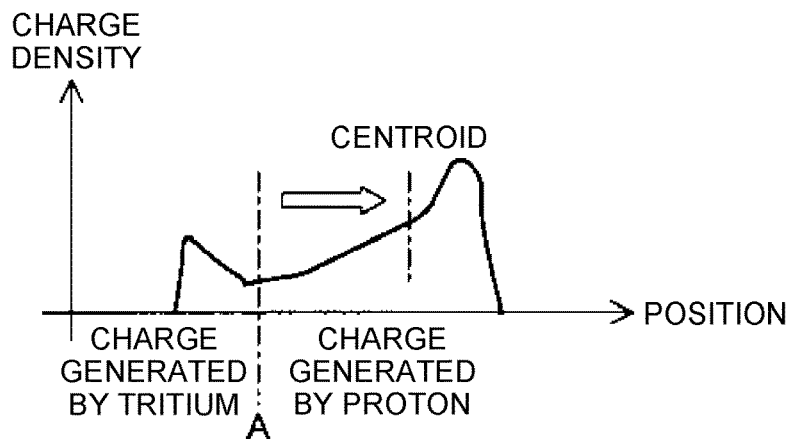
FIG. 3 is a graph showing a relationship between the position and density of the charge generated in the same neutron position detector.
FIG. 4 is a table showing a relationship between the additive gas type and the ranges in the same neutron position detector.
FIG. 5 is a table showing a relationship between the additive gas type and the operating voltage in the same neutron position detector.

As shown in FIG. 2C, the charge e is generated in a range from the position A at which the proton p and the tritium T were produced until the proton p and the tritium T stop. Because the masses and the energies are not equal between the proton p and the tritium T, the ranges from the position A at which the nuclear reaction occurred until stopping are different from each other. Therefore, as shown in FIG. 3, the centroid of the charge e made by the proton p and the tritium T is shifted toward the proton p-side from the position A at which the nuclear reaction occurred. Accordingly, the position A at which the nuclear reaction occurred and the centroid of the charge e are shifted. Also, the directions in which the proton p and the tritium T travel are random.

Therefore, when it is assumed that many neutrons n react at one point of the neutron position detector 11, the centroid of the charge e created in the gas 23 is not at one point, but is spread over a range having a correlation with the ranges of the proton p and the tritium T.

In the neutron position detection device 10 that uses the neutron position detector 11, the incident position of the neutron n is detected by determining the centroid of the charge e; therefore, the detection accuracy, i.e., the position resolution, of the incident position of the neutron n is affected more as the ranges of the proton p and the tritium T increase.

Accordingly, to increase the position resolution, it is sufficient to reduce the ranges of the proton p and the tritium T; to this end, it is necessary to use a heavy additive gas or increase the partial pressure of the additive gas.

However, nitrogen has little effect on reducing the ranges of the proton p and the tritium T. The relationship between the gas type and the ranges of the proton p and the tritium T are shown in the table of FIG. 4. The ranges of the proton p and the tritium T per atmosphere of gas at 0° C. are shown in the table of FIG. 4.

It can be seen from the table of FIG. 4 that carbon tetrafluoride and carbon dioxide have high effects of reducing the ranges of the proton p and the tritium T and are excellent as additive gases of the neutron position detector 11.

On the other hand, although nitrogen functions as a quenching gas, the ranges of the proton p and the tritium T are long, therefore making it necessary to increase partial pressure to obtain the desired ranges of the proton p and the tritium T.

(Reason 2)

When nitrogen is added as the additive gas of the neutron position detector 11, compared to carbon tetrafluoride or carbon dioxide, the output charge for the applied operating voltage is markedly reduced.

The ratio of the output charge for the applied operating voltage decreases as the partial pressure of the added nitrogen increases, therefore making it necessary to apply a higher operating voltage to obtain the desired output charge.

The table of FIG. 5 shows the relationship between the gas type and the operating voltage. As an example, the table of FIG. 5 shows the increase amount of the operating voltage when increasing the additive gas by 1 atm in the product of a typical neutron position detector 11 (cathode diameter $\phi 1/2=12.7$ mm, anode diameter $\phi$ of 11 μm, pressure of $^3$He gas of 20 atm).

It can be seen from the table of FIG. 5 that nitrogen has a higher operating voltage than the other gases. As the operating voltage of the neutron position detector 11 is increased, problems occur in that there is a risk that discharge may occur between the enclosure 20 and the anode 21, the withstand voltage of the elements used in the processing circuit 13 may be exceeded, etc.

From the above reasons 1 and 2, when added as the additive gas of the neutron position detector 11, nitrogen functions as a quenching gas but has a weak ability to reduce the ranges of the proton p and the tritium T; therefore, when the partial pressure of nitrogen is increased to reduce the ranges of the proton p and the tritium T, then the operating voltage undesirably increases. Accordingly, until now, nitrogen has not been applied to products as an additive gas of the neutron position detector 11.

In contrast, in the neutron position detector 11 of the embodiment, the additive gas includes nitrogen as a quenching gas and argon as a gas that reduces the ranges of the proton p and the tritium T that are reaction products of the neutron n and the $^3$He gas.

Although nitrogen is not used as quenching gas in the neutron position detector 11 as described above due to the lengths of the ranges of the proton p and the tritium T and/or the high operating voltage, the long life of nitrogen is an example of its advantages. The triple bond of the nitrogen molecule has the characteristic of being not easy to break because the bond energy is greater than those of the double bond of carbon dioxide and the single bond of carbon tetrafluoride.

Also, the disadvantages of nitrogen such as the lengths of the ranges of the proton p and the tritium T and the high operating voltage are eliminated by adding argon together with nitrogen.

In such a case, when using the neutron position detector 11 in practice, it is favorable for the partial pressure of nitrogen to have the relationship of d×pN2>0.03 (atm·cm), where d (cm) is the inner diameter of the enclosure 20, and pN2 (atm) is the partial pressure of nitrogen. It is necessary to increase the partial pressure of nitrogen when the inner diameter of the enclosure 20 is narrow because the ultraviolet rays must be absorbed within a short distance when the inner diameter is narrow. When the partial pressure of nitrogen is less than the partial pressure determined by the formula above, there is a possibility that the absorption of the ultraviolet rays may not be sufficient, the operation may become unstable, or discharge may occur at a low voltage.

Also, it can be seen from the table of FIG. 4 that the ranges of the proton p and the tritium T of argon are substantially equal to those of nitrogen.

However, the applied voltage at which the same output charge is obtained is drastically different between argon and nitrogen. It can be seen from the table of FIG. 5 that when argon and nitrogen are added with the same partial pressure, the effect on the operating voltage of argon is about ⅓ of that of nitrogen. Accordingly, argon is superior to nitrogen as an additive gas for reducing the ranges of the proton p and the tritium T. That is, even when the partial pressure of argon is increased to reduce the ranges of the proton p and the tritium T, the effect on the operating voltage is small. In such a case, it is favorable for the relationship to be such that the partial pressure of argon is greater than the partial pressure of nitrogen to reduce the ranges of the proton p and the tritium T.

However, the partial pressure of argon cannot be increased limitlessly because compared to nitrogen, argon has the disadvantage of having high sensitivity to gamma rays and having an effect on the operating voltage that is not completely negligible. Also, although the ranges of the proton p and the tritium T decrease as the partial pressure of argon increases, the position resolution of the neutron position detector 11 is not determined only by the ranges of the proton p and the tritium T, and is also affected by thermal noise of the electrical circuit system and the S/N ratios of the preamplifiers; and the position resolution is not limitlessly improved only by increasing the partial pressure of argon. On the other hand, when the pressure of argon is too low, the ranges of the proton p and the tritium T are not reduced, and the position resolution that is important in the neutron position detector 11 is not improved.

Accordingly, in practice, the partial pressure of argon has an appropriate range that is favorably 1 to 3 atm. The total of the ranges of the proton p and the tritium T is substantially inversely proportional to the pressure and is 13 mm at 1 atm of argon and 4.3 mm at 3 atm. On the other hand, when using the neutron position detector 11 in practice, the position resolution is in the range of 4 mm to 20 mm; and setting argon to 1 to 3 atm would actually realize a significant improvement of the position resolution. Although the ranges of the proton p and the tritium T are reduced by setting the partial pressure of argon to be greater than this range, other factors (the thermal noise of the electrical circuit, etc.) prevail, the position resolution is not improved, the gamma ray sensitivity is increased, the operating voltage is increased, and only disadvantages become pronounced. On the other hand, when the subdivision of argon is less than this range, the effect of adding argon is small, and the obtained advantages are meager.

Thus, in the neutron position detector 11 of the embodiment, because the additive gas includes nitrogen as a quenching gas and argon as a gas that reduces the ranges of the proton p and the tritium T that are reaction products of the neutron n and the $^3$He gas, a longer life is possible while ensuring the position resolution, i.e., the detection accuracy of the incident position of the neutron n.

While certain embodiments of the inventions have been described, these embodiments have been presented by way of example only, and are not intended to limit the scope of the inventions. These novel embodiments may be embodied in a variety of other forms; and various omissions, substitutions, and changes may be made without departing from the spirit of the inventions. Such embodiments and their modifications are within the scope and spirit of the inventions, and are within the scope of the inventions described in the claims and their equivalents.

What is claimed is:

1. A neutron position detector, comprising:
an enclosure used as a cathode, the enclosure being tubular;
an anode located at an axial center inside the enclosure; and
a gas sealed inside the enclosure,
the gas including a $^3$He gas and an additive gas,
the additive gas including
nitrogen as a quenching gas, and
argon as a gas reducing a range of a reaction product of a neutron and the $^3$He gas.

2. The neutron position detector according to claim 1, having a relationship of $$d \times pN2 > 0.03,$$

where d (cm) is an inner diameter of the enclosure, and pN2 (atm) is a partial pressure of the nitrogen.

3. The neutron position detector according to claim 1, wherein
a partial pressure of the argon added to the $^3$He gas is greater than a partial pressure of the nitrogen.

4. The neutron position detector according to claim 1, wherein
a partial pressure of the argon added to the $^3$He gas is in a range of 1 to 3 (atm).

5. The neutron position detector according to claim 1, further comprising:
a first terminal located at one end part of the enclosure; and
a second terminal located at an other end part of the enclosure.

6. The neutron position detector according to claim 5, wherein
the first terminal and the second terminal are insulated from the enclosure.

7. The neutron position detector according to claim 1, wherein
the enclosure is circular tubular and is sealed at two ends, and
the gas including the $^3$He gas and the additive gas is sealed in a sealed space inside the enclosure.

8. The neutron position detector according to claim 1, wherein
the anode is a resistive core wire having a constant resistance value per unit length.

9. The neutron position detector according to claim 8, further comprising:
a first terminal located at one end part of the enclosure; and
a second terminal located at an other end part of the enclosure,
one end part of the anode being electrically connected with the first terminal,
an other end part of the anode being electrically connected with the second terminal.

10. The neutron position detector according to claim 9, wherein
the first terminal and the second terminal are insulated from the enclosure.

11. The neutron position detector according to claim 1, wherein
the $^3$He gas is ionized by absorbing the neutron.

12. The neutron position detector according to claim 1, wherein
a partial pressure of the $^3$He gas is in a range of 10 to 20 (atm).

13. The neutron position detector according to claim 1, wherein
a voltage applied between the enclosure and the anode is in a range of 2.0 to 2.5 (kV).

14. The neutron position detector according to claim 13, wherein
the neutron enters the enclosure when the voltage is applied between the enclosure and the anode,
a nuclear reaction occurs between the $^3$He gas and the neutron that entered, and
a proton and tritium are produced as reaction products.

15. The neutron position detector according to claim 14, wherein
the proton and the tritium travel through the gas in mutually-opposite directions.

16. The neutron position detector according to claim 15, wherein
a total of ranges of the proton and the tritium inside the gas is in a range of 2.0 to 2.7 (mm).

17. The neutron position detector according to claim 15, wherein
the proton and the tritium collide with the $^3$He gas so that a portion of energy of the proton and the tritium causes the $^3$He gas to ionize and generate a charge.

18. The neutron position detector according to claim 17, wherein
an electric field formed between the enclosure and the anode causes the generated charge to be collected by the anode.

19. The neutron position detector according to claim 1, wherein
the nitrogen absorbs ultraviolet rays produced when ionized $^3$He ions recombine.

20. The neutron position detector according to claim 1, wherein
a charge output from the anode is in a range of 2 to 5 (pC).

* * * * *